UNITED STATES PATENT OFFICE.

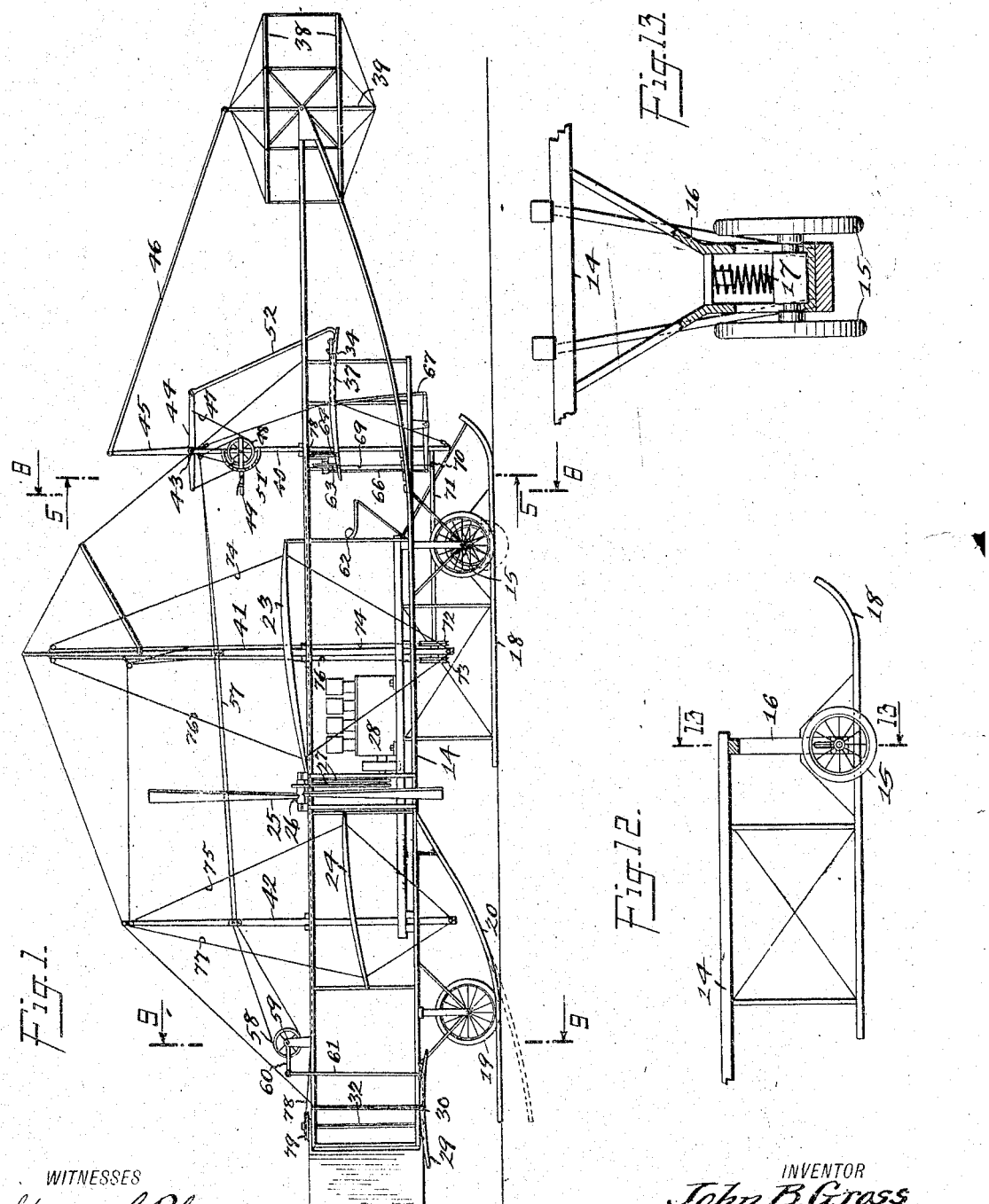

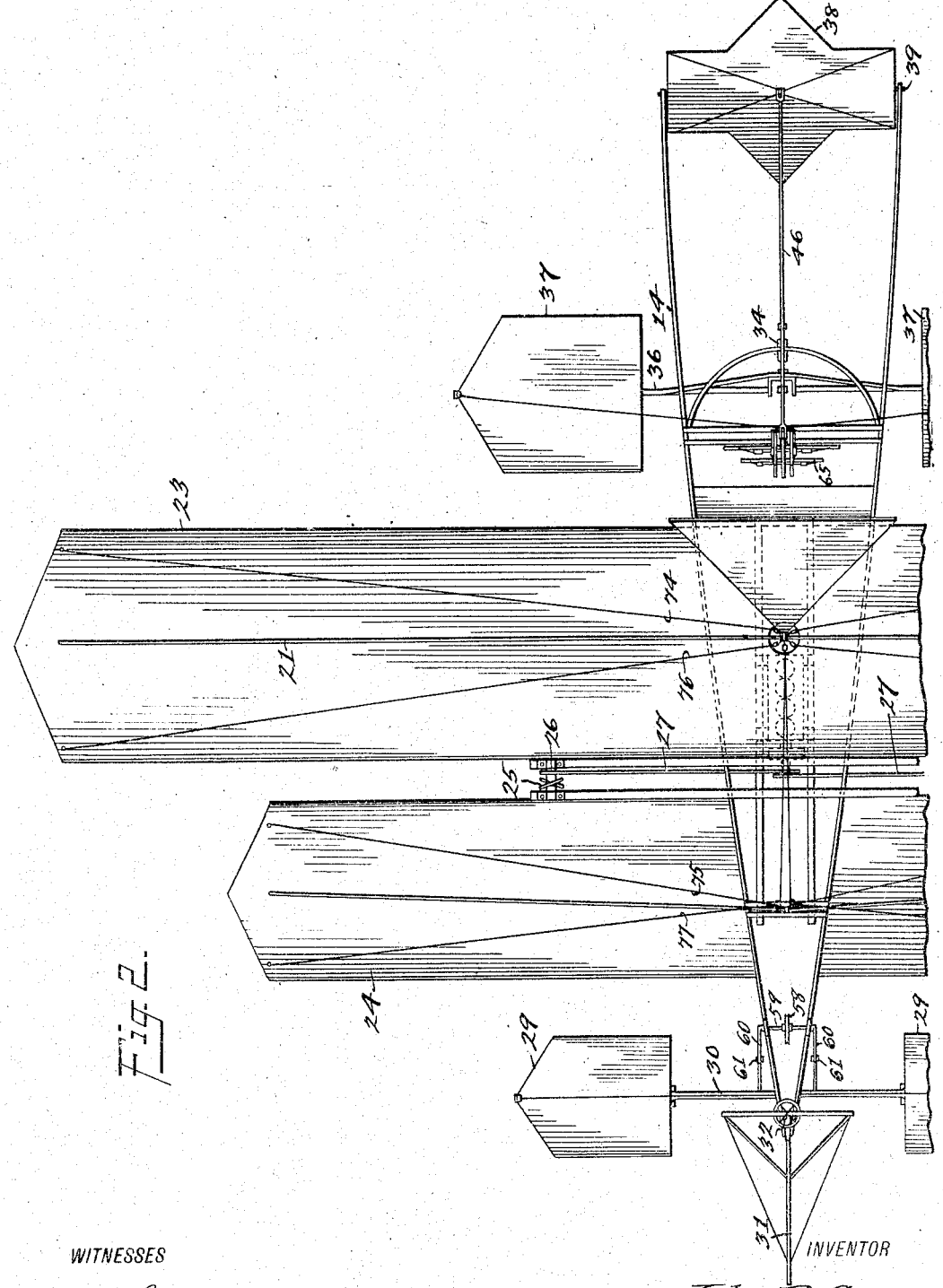

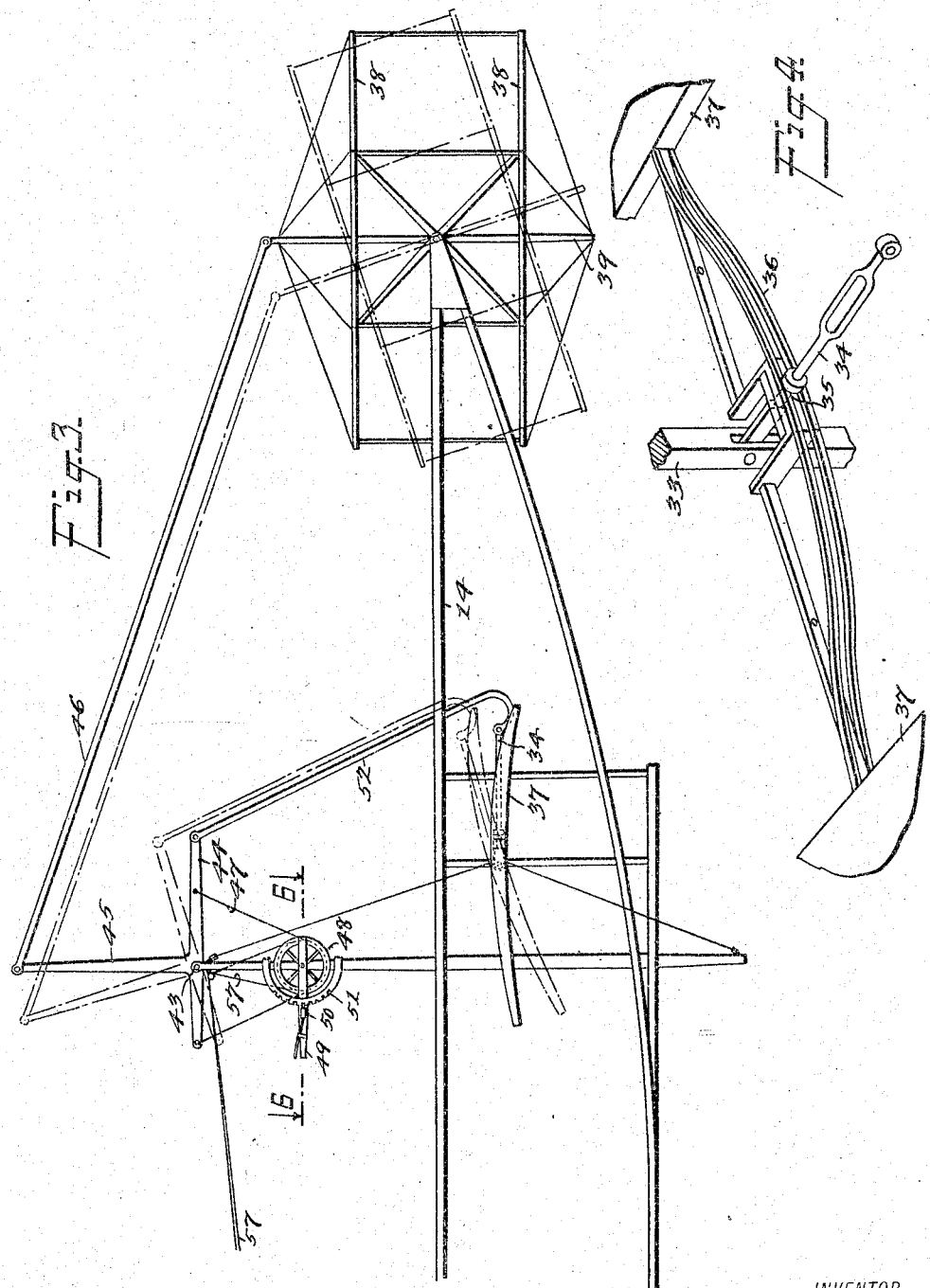

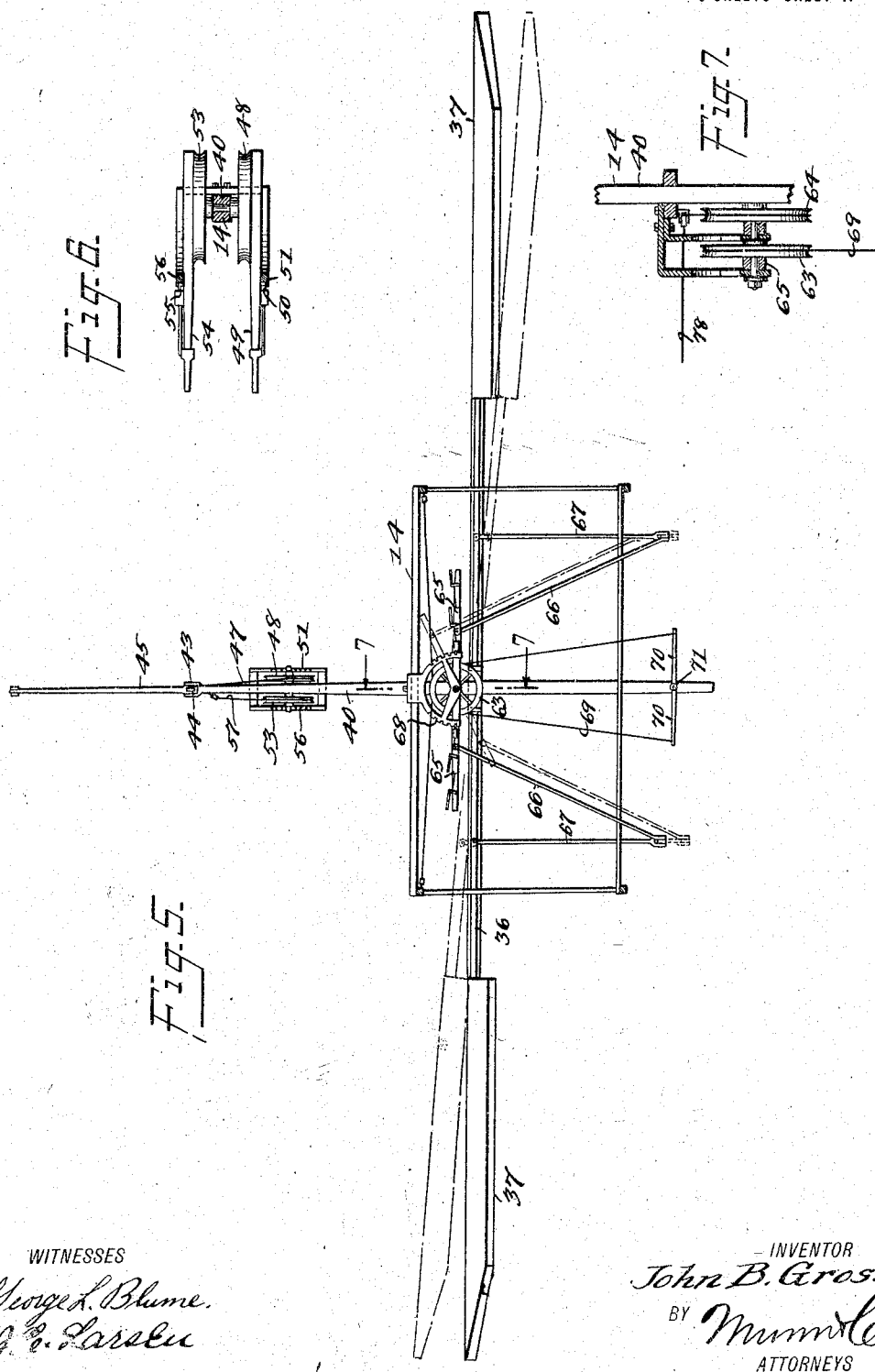

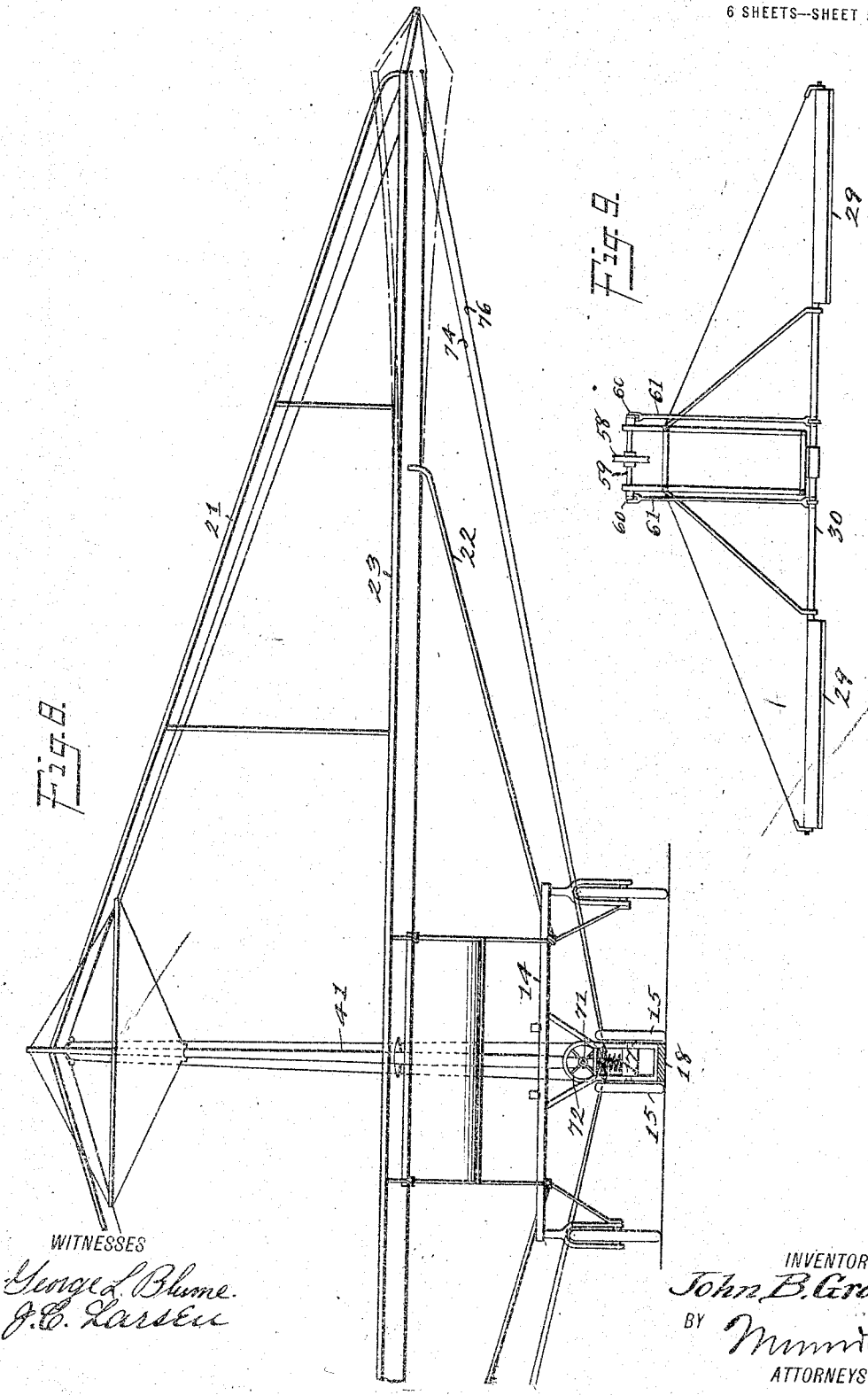

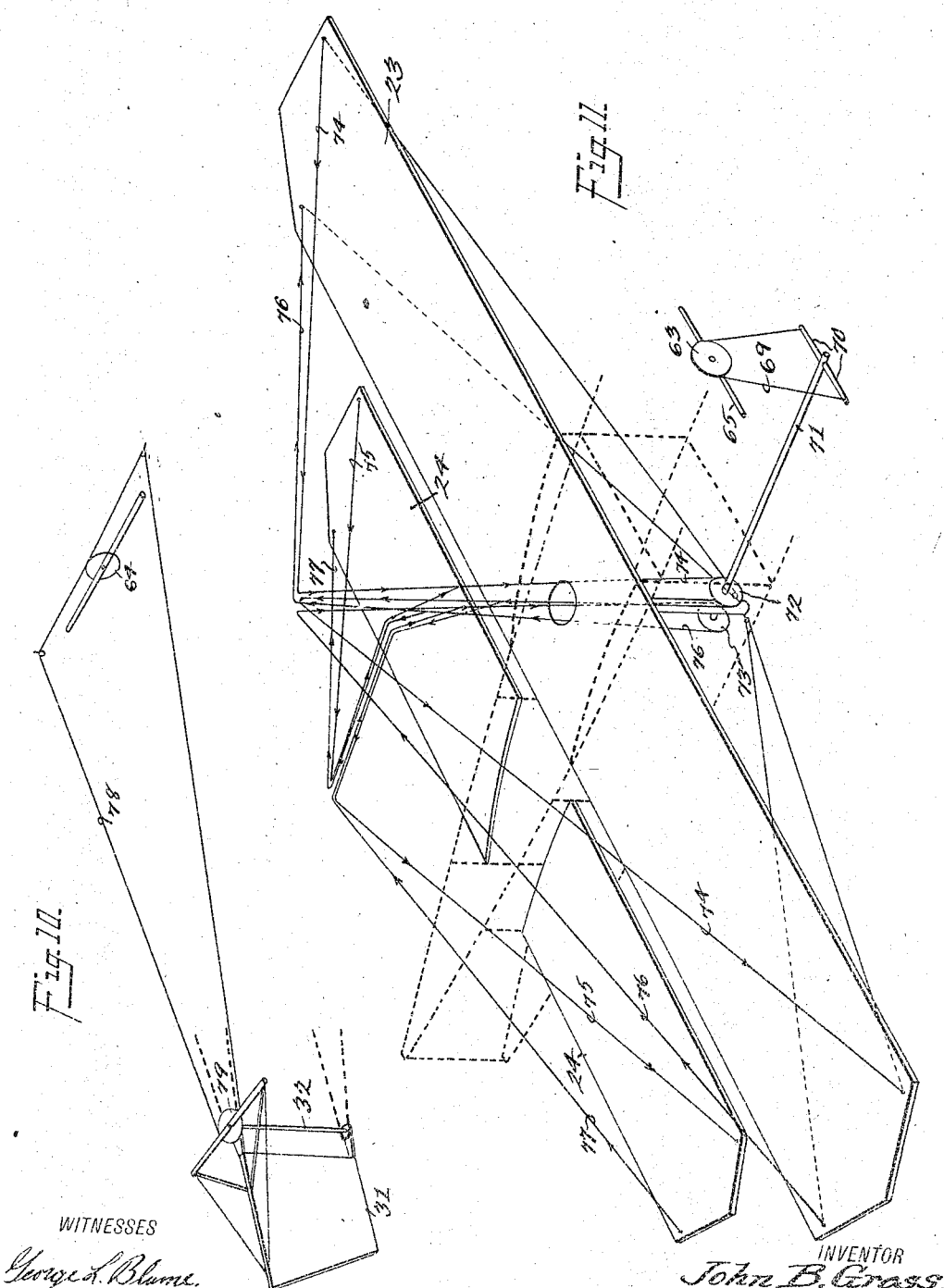

JOHN B. GROSS, OF NEW YORK, N. Y., ASSIGNOR TO JOSEPH W. CONNELLY, OF JERSEY CITY, NEW JERSEY.

AEROPLANE.

1,167,293.

Specification of Letters Patent.

Patented Jan. 4, 1916.

Application filed November 30, 1914. Serial No. 874,699.

*To all whom it may concern:*

Be it known that I, JOHN B. GROSS, a citizen of the United States, and a resident of New York, borough of Brooklyn, in the county of Kings and State of New York, have invented certain new and useful Improvements in Aeroplanes, of which the following is a specification.

My invention relates to aeroplanes, and one of the main objects thereof is to provide a relatively great area of sustaining surface; another object is to provide a positive control of the steering and stabilizing means.

A further object is to provide means for warping the ends of the sustaining planes in the proper directions and degrees simultaneously.

A further object is to provide ailerons which are movable into and out of horizontal planes both longitudinally and laterally of the aeroplane.

A further object is to provide new and improved means for taking the impact of landing; and other objects are to provide such devices which are simple in construction and operation, under positive control to meet all atmospheric conditions, and comparatively inexpensive.

My invention is fully described in the following specification, of which the accompanying drawings form a part, in which the separate parts are designated by the same reference characters in each of the views, and in which:—

Figure 1 is a side elevation of an aeroplane constructed in accordance with my present invention; Fig. 2 is a fragmentary plan view thereof; Fig. 3 is an enlarged side elevation of the forward part of the aeroplane; Fig. 4 is an enlarged, detached, perspective, view of a detail of the construction; Fig. 5 is a section taken on the line 5—5 of Fig. 1; Fig. 6 is an enlarged section taken on the line 6—6 of Fig. 3; Fig. 7 is a similar view taken on the line 7—7 of Fig. 5; Fig. 8 is a section taken on the line 8—8 of Fig. 1; Fig. 9 is a section taken on the line 9—9 of Fig. 1; Fig. 10 is a diagrammatic view of one control; Fig. 11 is a diagrammatic view of another control; Fig. 12 is a fragmentary, sectional, view of a detail; and Fig. 13 is an enlarged section taken on the line 13—13 of Fig. 12.

In the drawings forming a part of this application I have shown a present preferred form of embodiment of my invention, comprising a suitable frame 14 having vertically movable landing wheels 15 slidable in guiding supports 16 and normally maintained at their lowest points by springs 17, in order that a landing may be taken without jars, and I also provide landing shoes or runners 18 adapted to limit the give to the wheels 15; at the rear of the frame 14 is a fixed wheel 19 and resilient runners 20 operating in conjunction therewith, and it will thus be seen that the impact of landing is taken resiliently both in the forward part and rear part of the aeroplane.

The frame is provided with oppositely and transversely directed arms 21 and 22 which rigidly support the main sustaining planes 23 along the axial line thereof, but without interference with the movement of the ends of said planes in a rotary direction with respect to said axis, or said arms, said planes 23 being mounted approximately midway of the forward and rear ends of the aeroplane.

Similarly carried by the frame 14, directly to the rear of the main planes 23 are similar but shorter auxiliary planes 24, the former being preferably on a slightly higher level than the latter, as shown in Fig. 1, and the propellers 25 are arranged between said main and auxiliary planes, one on each side of the central plane of the aeroplane, on shafts 26 actuated by belts 27 in operative connection with a motor 28 in any desired manner, this propeller arrangement, as also that of the motor, and the types thereof, being entirely optional with me, as I claim no novelty therein.

Rearward of the planes 24 are rear elevating planes 29 carried by a shaft 30 rotatable in said frame 14, Figs. 2 and 9, and to the rear thereof is the rudder 31 carried by a vertical shaft 32, and the operating means of which will be later described.

Pivotally mounted in a fixed, vertical, portion 33 of the frame 14, forwardly of the main planes 23, is a forwardly directed lever 34 which has a journal 35 turned thereon for a frame 36 the arms of which are outwardly and transversely directed and carry, each, an aileron 37, and it will be seen that the frame 36 may be revolved through a desired arc of a circle on its journal, thus moving one aileron 37 upwardly and the other downwardly of the horizontal, lateral, plane of the aeroplane, and it will also be seen that, if the lever 34 be raised or lowered, in a manner to be described, the ailerons 37 are carried into or out of a plane horizontal to and longitudinal of the aeroplane, irrespective of any adjustment into or out of the lateral horizontal plane referred to.

At the forward end of another frame 14 is the elevating plane 38 and which is preferably of double surface carried by a frame 39 in pivotal connection with the frame 14, and adapted to be moved into and out of a horizontal, longitudinal, plane of the aeroplane as later set forth, and I prefer to shape the elevating plane 38 as illustrated in Fig. 2.

The frame 14 carries three vertical supports 40, 41, and 42, suitably braced, and to the first of which is pivoted, at 43, a normally horizontal lever 44 carrying a vertical arm 45 and to which is pivoted a link 46 likewise pivoted to the frame 39 of the plane 38, thus insuring the actuation of said plane 38 in the movement of said lever; this lever is provided with a short length of cable 47 passed taut around a pulley 48 revoluble on the support 40, Figs. 1, 3, 5 and 6, and adapted to be so revolved by means of a lever 49 provided with a pawl 50 operating over a segment gear 51 whereby the lever 49 and connected parts may be locked in any desired position.

The forward end of the lever 44 has a link 52 in pivotal connection therewith in turn pivoted to the lever 34, and it will be seen that, when this elevating plane is actuated on its pivot, the ailerons 37 are moved accordingly, into or out of the longitudinal, horizontal, plane of the aeroplane. The vertical support 40 also carries a pulley 53 adapted to be actuated by means of a lever 54 provided with a pawl 55 in operation with a segment gear 56, a cable 57 being passed around this pulley and, through suitable guide staples or pulleys, to a pulley 58 on a shaft 59 carrying an arm 60 in pivotal connection at its end with a link 61 likewise pivoted to the rear elevating planes 29 whereby they may be moved into or out of the horizontal, longitudinal, plane of the aeroplane at will, and it will be noted that these control levers are located conveniently to a driver's or pilot's seat 62. Also located conveniently thereto, and carried on the vertical support 40, are two pulleys 63 and 64, Figs. 5 and 7, the former of which is adapted to be revolved by means of a double winged lever 65 having a link 66 pivoted thereto at each side of its fulcrum, said links being in pivotal connection with vertical rods 67 in turn pivoted to corresponding arms of the aileron frame 36, Fig. 5, said lever 65 having pawls thereon operating in conjunction with a segment gear 68 to lock said aileron frame 36 in any desired position, in or out of the lateral, horizontal, plane of the aeroplane, without interference with the rotary movement of said frame 36 in its pivotal connection, through the lever 34, with the frame portion 33.

The pulley 63 has a cable 69 passed thereover and extended downwardly on either side thereof to corresponding arms 70 secured to a longitudinally arranged shaft 71, Figs. 1, 5, and 11, and the rear end of which carries two pulleys 72 and 73, a cable 74 being passed around the former and upwardly through guides carried by the vertical support 41 and downwardly into connection with the forward corners of the ends of the main planes 23 in such manner that, when the shaft is rotated to revolve the pulley 72, one corner is drawn upwardly and the other is free to move downwardly, and vice versa; the cable 74 is provided with branches 75 which pass through suitable guides in the vertical support 42 and thence downwardly for connection with the forward corners of the ends of the auxiliary planes 24, and it will be seen that these planes are distorted with the main planes, and with the tilting laterally of the forwardly aileron frame 36. The pulley 73 has a cable 76 connected therewith and which is passed, in the manner of the cable 74, to the rear corners of the ends of the main planes, and branch cables 77 secured thereto pass to the auxiliary planes, at the rear corners of the ends thereof, said cables of the pulleys 72 and 73 being so arranged as to exert strains on opposite ends of the main and auxiliary planes, in the rotation of the shaft 71 in either direction, whereby one corner of each end of each plane is raised, and the other corner lowered, and the forward ailerons are correspondingly affected.

The pulley 64, on the support 40, Figs. 1, 2, 7 and 10, has a cable 78 connected therewith and passed rearwardly to and around a pulley 79 on the shaft rudder shaft 32, and it will be thus seen that the rudder 31 may be swung in the desired relationship with the aeroplane. It will also be seen that, from the pilot's seat, the forward elevating plane may be moved in desired direction and degree, the ailerons being correspondingly and simultaneously actuated in a rotary manner with respect to the transverse axis thereof; the movement of the forward aileron frame synchronizes with the distortion of the ends of the main and auxiliary sustaining planes; and the rear elevating planes 29 may be independently actuated in desired manner and degree, and absolute control results, as also positive stability, but under the control of the pilot.

Because of the relatively great area of the sustaining planes, my aeroplane will support very great loads, and it is very simple in construction in view of the advantages possessed thereby, and comparatively inexpensive, and, while I have shown certain details of construction, it will be obvious that I do not limit myself thereto, but may make changes thereover, within the scope of the following claims, without departing from the spirit of my invention, or sacrificing its advantages.

Having fully described my invention, what I claim as new, and desire to secure by Letters Patent, is:—

1. In an aeroplane, a frame, main sustaining planes, auxiliary sustaining planes, ailerons, a frame for carrying said ailerons, means for simultaneously warping the ends of said planes and inclining said aileron frame on an axis arranged longitudinally of said aeroplane, an elevating plane, and means for simultaneously actuating said elevating plane and rotating said aileron frame on an axis arranged transversely of said aeroplane.

2. In an aeroplane, a frame, sustaining planes, ailerons arranged forwardly thereof, elevating planes arranged rearwardly thereof, means for simultaneously warping the ends of said sustaining planes and moving said ailerons about a longitudinal axis, means for rotating said ailerons on a transverse axis, and means for inclining said elevating planes.

3. In an aeroplane, a frame, sustaining planes, ailerons arranged forwardly thereof, a frame for said ailerons, elevating planes at the rear of said sustaining planes, means for warping said sustaining planes, means for moving said aileron frame about a longitudinal axis, means for rotating said ailerons on a transverse axis, and means for inclining said elevating planes.

4. In an aeroplane, a frame, sustaining planes, elevating planes, means for actuating the same, a rudder, means for actuating the same, ailerons arranged forwardly of said sustaining planes, a frame therefor pivoted to said aeroplane frame, means for tilting said aileron frame on a longitudinal axis, means for rotating said aileron frame on a transverse axis, and means for warping said sustaining planes.

5. In an aeroplane, a frame, sustaining planes, a rudder, an elevating plane, a lever pivoted to said frame and directed forward, a supplemental frame in pivotal connection with said lever and adapted to move into and out of the lateral, horizontal plane of the aeroplane, ailerons carried by said supplemental frame, and means for moving said lever to move said ailerons into and out of the longitudinal, horizontal, plane of said aeroplane.

6. In an aeroplane, a vertical support, elevating planes, a lever pivoted to said support and normally held in horizontal position, said lever being provided with a journal, a frame rotatable on said journal arranged transversely of said aeroplane, and ailerons on opposite ends of said rotatable frame, said aileron frame being rotatable on a longitudinal axis of said aeroplane when moved on said journal, and about a transverse axis of said aeroplane when said lever is moved, and means for connecting said elevating planes with said aileron frame to actuate both simultaneously.

In testimony whereof I have signed my name to this specification in the presence of two subscribing witnesses.

JOHN B. GROSS.

Witnesses:
ALEXANDER C. HUTTON,
DANIEL A. SULLIVAN.